United States Patent Office 3,110,596

Patented Nov. 12, 1963

3,110,596

PROCESS FOR SIMULTANEOUSLY DEVELOPING AND FIXING PRINTING PLATES

Hans Heiss and Dieter Osswald, Wiesbaden-Biebrich, Germany, assignors, by mesne assignments, to Azoplate Corporation, Murray Hill, N.J.

No Drawing. Filed Nov. 27, 1959, Ser. No. 855,597

Claims priority, application Germany Aug. 8, 1958

4 Claims. (Cl. 96—48)

This invention relates to a novel process for the development of lithographic printing plates and, more particularly, relates to a process for developing such plates in which metal salts capable of forming hydrophilic water-insoluble coatings on the non-image areas of lithographic printing plates are incorporated into the developer solution.

It is known to the art that planographic printing plates can be prepared photomechanically by a process in which the light-sensitive side of a metal plate or foil, for example an aluminum plate or foil, provided with a coating of a water-insoluble light-sensitive compound, preferably a diazo compound, is exposed to light under a master and the exposed coating is then developed to produce an image by means of a dilute aqueous alkaline solution. Examples of known developers for such presensitized sheets are dilute aqueous solutions of disodium or trisodium phosphate, or water-soluble organic bases. Depending on the type of light-sensitive substance used in the presensitized sheet, the printing images obtained from the originals by means of the alkaline developer are either positive or negative, depending upon whether it is the part of the light-sensitive coating struck by light, or that part not struck by light, that is removed by the developer.

In order that the thus prepared printing image will accept greasy ink without the ink being accepted by the parts of the surface of the sheet which do not form part of the printing image, the developed plate, after thorough rinsing with water, is treated with solutions of acids or acid salts. This acid treatment, also known as fixing, insures that printing may be effected from the plates without scumming occurring and provides for good differentiation between the oleophilic image and the hydrophilic metal surface.

In accordance with known procedures, then, the preparation of printing plates comprises the following steps:

(1) Exposure to light of the presensitized printing plate,
(2) Alkaline development of the exposed plate,
(3) Rinsing of the developed plate with water,
(4) Acid treatment of the developed and rinsed plate, i.e. fixing, and
(5) Inking up of the image with greasy printing ink.

The present invention relates to a considerably simplified and improved procedure for the preparation of printing plates using aqueous alkaline developers. In the process of the present invention, the presensitized aluminum or zinc sheet is exposed under a master in a conventional manner and is then developed with aqueous solutions of salts capable of forming hydrophilic, water-insoluble coatings on the non-image areas of the plate from which the light-sensitive compound or its light-decomposition product has been removed, the aqueous solutions having a pH value in the alkaline region of from 7 to 12. The printing images thus produced are then inked up with greasy ink, either before or after being mounted on a printing machine.

If the salts used in the developing and fixing agent, i.e. salts capable of forming hydrophilic water-insoluble coatings, produce alkaline-reacting solutions when dissolved in water, the addition of another substance causing the salt solutions to have alkaline reactions in the pH-range stated above is not necessary. If, however, the salts do not produce alkaline-reacting solutions in water, it is necessary that another substance be added to the salt solution in order that the developer may be alkaline reacting. Such substances may be added as have been heretofore used for the preparation of alkaline developers, for example, secondary and tertiary alkali salts of phosphoric acid or water-soluble organic bases.

The salts capable of forming water-insoluble hydrophilic coatings on the printing plate, in the non-image areas from which the light-sensitive substance or its light-decomposition product has been removed, may be present in the processing agent in the range of about 0.2 to 10 percent, by weight, the preferred salt content being in the range of 0.5 to 5 percent, by weight.

The following are examples of the salts to be used in accordance with the invention for the preparation of the processing agents: Salts of hydrofluosilicic acid with the general formula $M_2^I(SiF_6)$ and $M_1^{II}(SiF_6)$, of hydrofluotitanic acid with the general formulae $M_2^I(TiF_6)$ and $M_1^{II}(TiF_6)$, or hydrofluostannic acid with the general formula $M_2^I(SnF_6)$ and of hydrofluoboric acid of the type $(M_1^I(BF_4)$, which salts are acid in solution; these are added during the development process to the alkaline solution to produce a hydrophilic water-insoluble surface coating; salts of orthosilicic acid and metasilicic acid with the general formulae $M_2^IO.xSiO_2.xH_2O$ of titanic acid of the type $2M_2^IO.TiO_2$, and of stannic acid with the general formula $M_2^I(Sn(OH)_6)$, which salts are alkaline in solution.

Of these compounds, the salts of the alkali metals and the ammonium salts are of the greatest practical interest, but the invention is in no way restricted to the use of these particular compounds. Of the salts that are acid in solution, sodium hexafluosilicate, magnesium hexafluosilicate, ammonium hexafluotitanate, strontium hexafluotitanate, sodium hexafluostannate and sodium tetrafluoborate are used with advantage and of those that are alkaline in solution, sodium orthosilicate, sodium metasilicate, sodium titanate and sodium hexahydroxostannate.

Organic substances having high molecular weight may also be added, such as water-soluble cellulose alkyl ethers, polyvinyl alcohol and the like, which enhance the evenness of wetting of the exposed sheet and the development thereof, may also be added to the aqueous developing agents. The addition of organic solvents also is often advantageous, since it facilitates development.

Development of the exposed presensitized aluminum or zinc sheet by the process of the invention includes the considerable advantage that the treatment of the developed coating with dilute acid solutions and rinsing with water of the alkaline developed coating, which necessarily precedes such treatment can be eliminated. Thus, the process by which printing plates are prepared from presensitized sheets is reduced to the following three steps:

(1) Exposure of the light-sensitive plate under a master,
(2) Alkaline development of the exposed plate with simultaneous fixing, and
(3) Inking up of the image with greasy ink.

It is therefore apparent that the number of steps required to produce a printing plate is considerably reduced.

If the pH value of the developer prepared in accordance with the invention is in excess of 12, satisfactory inking up of the developed coating is possible only when preceded by a water treatment which reduces or eliminates the alkalinity of the plate surface. If the alkalinity of the developer is too high, a decrease in the quality and number of copies produced results.

The invention will be further illustrated by reference to the following specific examples:

*Example I*

For the development of a presensitized aluminum foil, the light-sensitive coating of which consists of a p-naphthoquinone-diazide sulfonic acid amide which has been exposed to light under a transparent negative master in conventional fashion, developing agents were used having the following compositions:

(*a*) 7.5 g. of tertiary sodium orthophosphate.$12H_2$
3.5 g of sodium metasilicate
2.0 g. of primary sodium orthophosphate.$1H_2O$
1.0 g. of sodium hexametaphosphate
1.0 g. of water-soluble methyl cellulose of medium viscosity
985.0 g. of distilled water
The pH value of the solution is 11.1.

(*b*) 4.0 g. of tertitary potassium orthophosphate
4.0 g. of sodium metasilicate
2.0 g. of primary potassium orthophosphate
0.5 g. of polyvinyl alcohol
989.5 g. of distilled water
The pH value of the solution is 11.0.

(*c*) 10.0 gms. of tertiary anhydrous sodium orthophosphate
1.0 gms. of sodium hexafluosilicate
1.0 gms. of water-soluble methyl cellulose of medium viscosity
988.0 gms. of distilled water
The pH value of the solution is 11.2.

(*d*) 4.5 g. of sodium metasilicate
0.9 g. of sodium hexametaphosphate
994.6 g. of distilled water
The pH value of the solution is 11.35.

(*e*) 10.0 g. of sodium stannate
0.5 g. of polyvinyl alcohol
989.5 g. of distilled water
The pH value of the solution is 11.2.

The positive printing plate produced is immediately inked up with greasy ink.

For the processing of a presensitized zinc foil which has been exposed to light under a transparent negative master and of which the light-sensitive coating consists of a monomeric arylidene furfurylidene acetone, e.g. cinnamal furfurylidene acetone, obtained by the condensation of cinnamal acetone with furfural, or benzal furfurylidene acetone obtained from benzalacetone and furfural, agents of the following composition are employed:

(*f*) 50.0 gms. of sodium metasilicate
5.0 gms. of polyglycol with a medium molecular weight of 6000
945.0 gms. of distilled water
The pH value of the solution is 11.6.

or (*g*) 50.0 gms. of tertiary anhydrous sodium orthophosphate
4.0 gms. of sodium tetrafluoborate
5.0 gms. of polyglycol with a medium molecular weight of 6000
941.0 gms. of distilled water
The pH value of the solution is 11.4.

The positive printing plate produced is immediately inked up with greasy ink.

For the processing of a presensitized aluminum foil which has been exposed to light under a transparent negative master and of which the light-sensitive coating consists of an anthracene sulfonic acid amide, e.g. anthracene-$\beta$-sulfonic acid anilide or anthracene-$\beta$-sulfonic acid-$\alpha$-naphthylamide, agents of the following composition are used:

(*h*) 10.0 gms. of sodium metasilicate
1.0 gms. of water-soluble methyl cellulose of medium viscosity
989.0 gms. of distilled water
The pH value of the solution is 12.0.

or (*i*) 50.0 gms. of monoethanolamine
10.0 gms. of sodium hexahydroxostannate
940.0 gms. of distilled water
The pH value of the solution is 11.8.

The positive printing plate is immediately inked up with greasy ink.

*Example II*

For the development of an aluminum foil, presensitized with a naphthoquinone-(1,2)-diazide sulfonic acid ester or a naphthoquinone-(1,2)-diazide sulfonic acid amide and exposed in conventional fashion under a transparent positive master, the following developing agents were used:

(*a*) 200.0 gms. of diethanolamine
5.0 gms. of magnesium hexafluosilicate
795.0 gms. of distilled water
The pH value of the solution is 10.5.

(*b*) 200.0 g. of triethanolamine
5.0 g. of ammonium hexafluotitanate
5.0 g. of water-soluble methyl cellulose of medium viscosity
790.0 g. of distilled water
The pH value of the solution is 10.2.

(*c*) 56.0 g. of sodium metasilicate
10.0 g. of sodium hexametaphosphate
934.0 g. of distilled water
The pH value of the solution is 11.65.

(*d*) 50.0 gms. of tertiary sodium orthophosphate$\cdot 12H_2O$
10.0 gms. of sodium hexahydroxostannate
70.0 gms. of glycol monoethylether
870.0 gms. of distilled water
The pH value of the solution is 11.6.

For the processing of a zinc foil presensitized with a coating of a naphthoquinone-(1,2)-diazide-sulfonic acid ester or naphthoquinone-(1,2)-diazide-sulfonic acid amide and exposed to light in known manner under a transparent positive master, agents of the following composition are used:

(*e*) 58.0 gms. of sodium metasilicate
18.0 gms. of tertiary sodium orthophosphate$\cdot 12H_2O$
4.0 gms. of primary sodium orthophosphate
920.0 gms. of distilled water
The pH value of the solution is 11.8.

(*f*) 15.0 gms. of sodium metasilicate
2.0 gms. of tertiary potassium orthophosphate
3.0 gms. of sodium hexametaphosphate
1.0 gms. of water-soluble methyl cellulose of medium viscosity
160.0 gms. of glycolmonomethylether
819.0 gms. of distilled water
The pH value of the solution is 11.6.

After development of foil is set up in a planographic machine and is ready for printing.

It will be obvious to those skilled in the art that many modifications may be made within the scope of the present invention without departing from the spirit thereof, and the invention includes all such modifications.

This application is a continuation-in-part of application Serial Number 830,725, filed July 31, 1959, now abandoned.

What is claimed is:

1. A method of developing a lithographic printing plate having a base sensitized with an organic light-sensitive compound, said base being selected from the group consisting of aluminum and zinc, consisting of treating the plate after exposure to light with a solution of at least one salt, the cation of which is selected from the group consisting of alkali metal ions and ammonium ions and the anion of which is selected from the group consisting of the anions of hydrofluosilicic acid, hydrofluotitanic acid, hydrofluostannic acid, hydrofluoboric acid, orthosilicic acid, metasilicic acid, titanic acid and stannic acid, the pH of the solution being in the range of 7 to 12, whereby the plate is simultaneously developed and fixed.

2. A method according to claim 1 in which the salt concentration in the solution is in the range of about 0.2 to 10 percent by weight.

3. A method according to claim 1 in which the solution also contains at least one compound selected from the group consisting of water-soluble organic bases and dibasic and tribasic alkali salts of phosphoric acid.

4. A method according to claim 1 in which the organic light-sensitive compound is selected from the group consisting of naphthoquinone-(1,2)-diazide sulfonic acid esters and amides.

References Cited in the file of this patent

UNITED STATES PATENTS

| | | |
|---|---|---|
| 2,186,945 | Wood | Jan. 16, 1940 |
| 2,186,946 | Wood | Jan. 16, 1940 |
| 2,261,439 | Kelly | Nov. 4, 1941 |
| 2,489,728 | Slifkin | Nov. 29, 1949 |
| 2,657,140 | Kessels | Oct. 27, 1953 |
| 2,702,743 | Schmidt | Feb. 15, 1955 |
| 2,714,066 | Jewett et al. | July 26, 1955 |
| 2,958,599 | Neugebauer | Nov. 1, 1960 |

FOREIGN PATENTS

| | | |
|---|---|---|
| 642,782 | Germany | Mar. 16, 1937 |
| 904,255 | France | Feb. 19, 1945 |
| 571,389 | Great Britain | Aug. 22, 1945 |
| 1,007,838 | France | Feb. 13, 1952 |

OTHER REFERENCES

Newman: The British Journal of Photography, January 23, 1959, pages 48 and 56, and January 30, 1959, pages 66–68.